United States Patent

[11] 3,628,650

[72] Inventor John Wilson Rouse
 Ramsey, N.J.
[21] Appl. No. 876,874
[22] Filed Nov. 14, 1969
[45] Patented Dec. 21, 1971
[73] Assignee American Can Company
 New York, N.Y.

[54] APPARATUS FOR ORIENTING CAN ENDS
 18 Claims, 21 Drawing Figs.
[52] U.S. Cl. ............................................. 198/33 AB
[51] Int. Cl. ............................................. B65g 47/24
[50] Field of Search ............................................. 198/33 AB;
 214/1 R

[56] References Cited
 UNITED STATES PATENTS
 2,968,387 1/1961 Lagler ............................ 198/33 AB

*Primary Examiner*—Edward A. Sroka
*Attorneys*—Robert P. Auber, George P. Ziehmer, Leonard R. Kohan, Patrick J. Walsh, Kenneth H. Murray and Warren N. Low ABSTRACT: A method and arrangement for orienting an article to a predetermined angular position. The article is embossed with impressions which conform to the rim surface of a rotatable member. A continuously turning wheel rotates the article to bring the embossment to the angular position which coincides with the position of the rotatable member. When such coincidence in positions is attained, the article is moved against the rotatable member so that the latter projects partially into the embossment shaped in the form of a recess facing the rotatable member. The rotatable member is then removed from the article and the latter is removed by a conveyor in oriented position.

INVENTOR.
JOHN WILSON ROUSE
BY
Leonard R. Kohan
ATTORNEY

INVENTOR.
JOHN WILSON ROUSE
BY Leonard R. Kohan
ATTORNEY

INVENTOR.
JOHN WILSON ROUSE
BY
Leonard R. Kohan
ATTORNEY

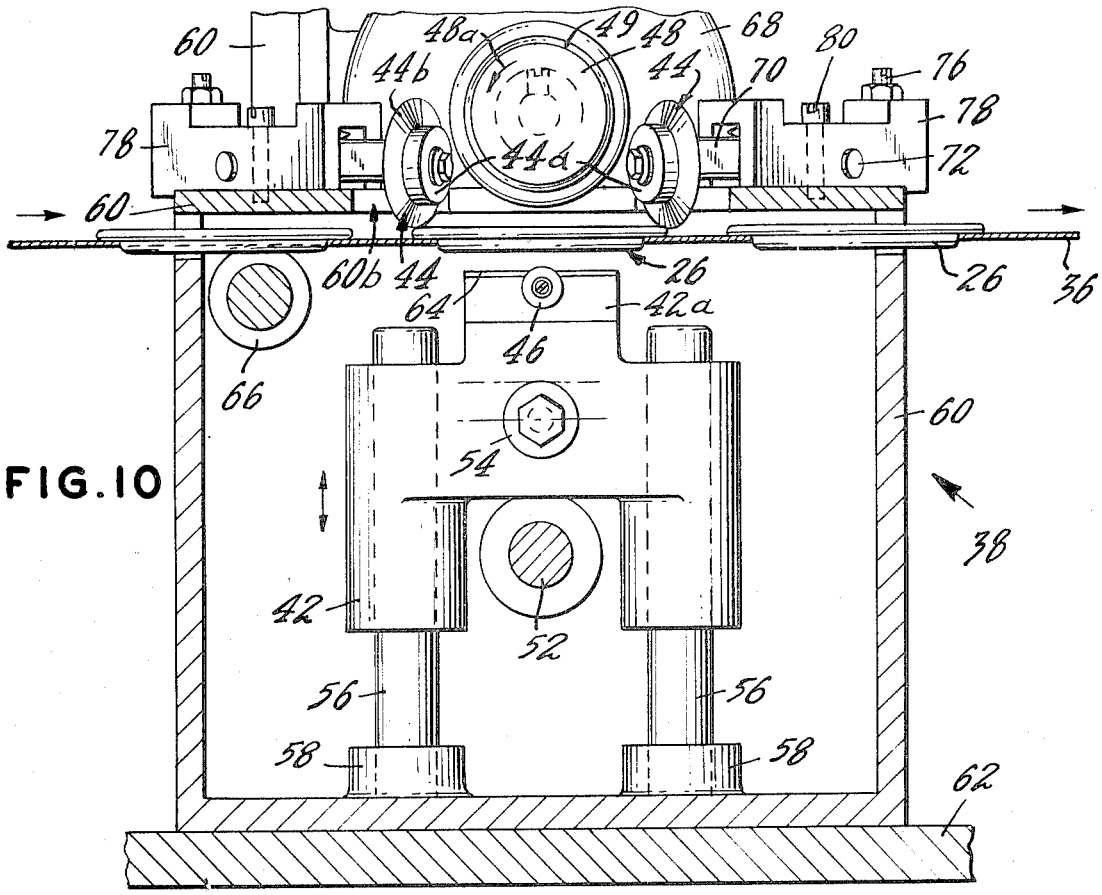
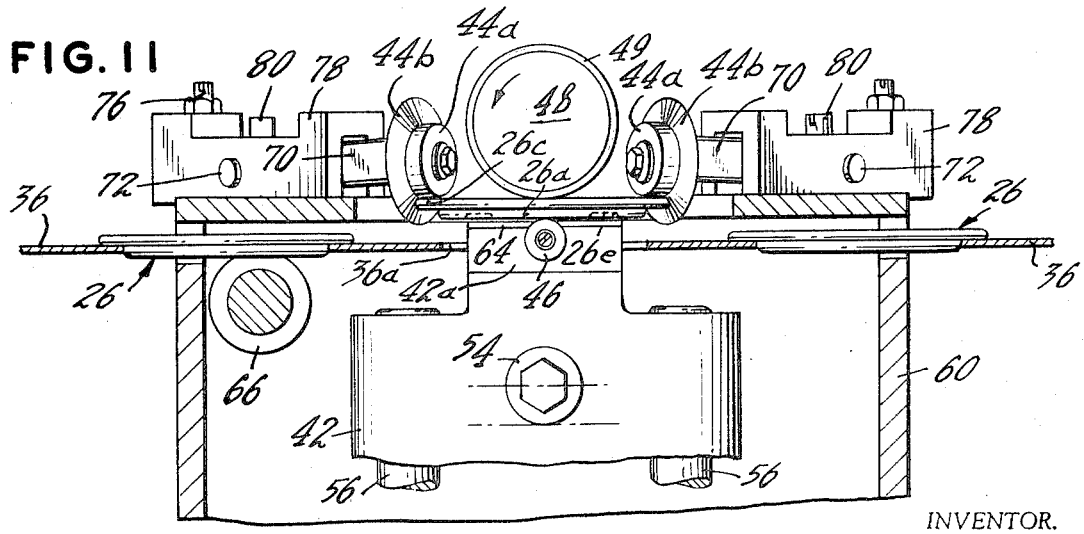

INVENTOR.
JOHN WILSON ROUSE
BY Leonard R. Kohan
ATTORNEY

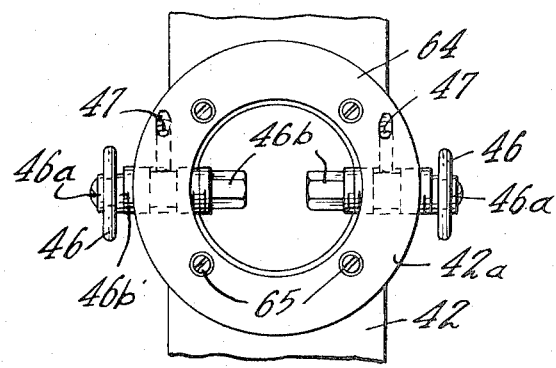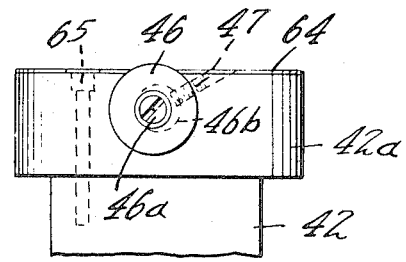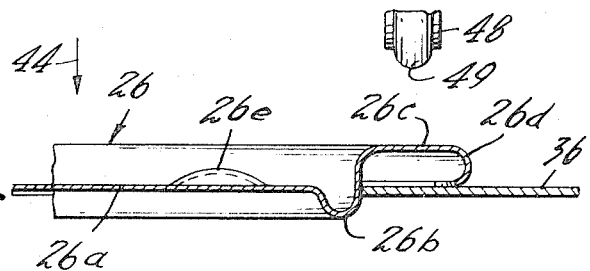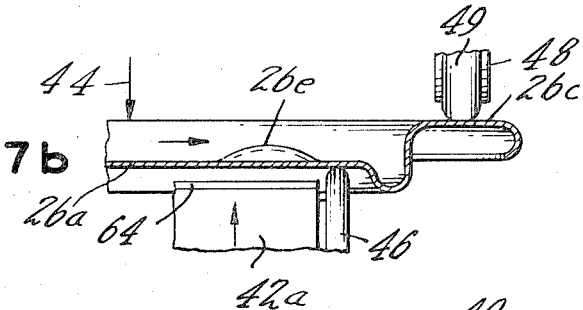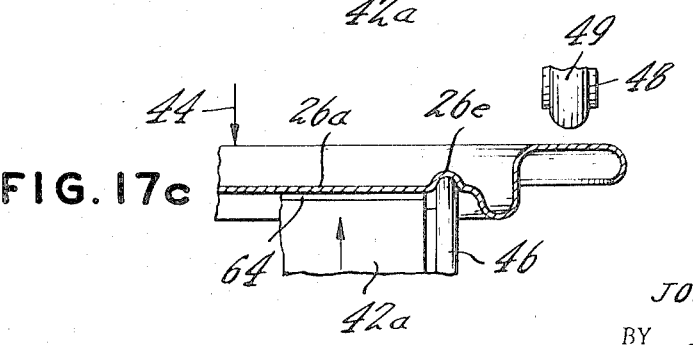

APPARATUS FOR ORIENTING CAN ENDS

BACKGROUND OF THE INVENTION

In the manufacture of containers such as cans for consumer products, it has been found advantageous to provide a simple device, on an end of the can, by which the consumer can gain access to the contents of the can without the use of special can openers. Such a can opening arrangement is especially useful for cans containing, for example, drinking fluids. To provide a simple can-opening device for this purpose, the top end of the can is scored and a tab containing a hole to accommodate a finger, is secured to a small surface area defined by the score. The consumer may readily open the can, with this device, by inserting his finger into the tab and pulling on the tab. When the tab is thus pulled, the score becomes severed and the can end becomes opened.

To facilitate opening of the can with the least amount of force applied to the tab while, at the same time, assuring that the score will not become severed as a result of shocks or vibrations which may be experienced by the can during transportation and handling, it has been found that it is of advantage to apply the score at a predetermined angle with respect to the grain direction of the metal used for the can end. Thus, it is of advantage to score the end of the can at a predetermined angle with respect to the grain direction of the can material for the purpose of assuring that the can remains sealed when transported, stacked and handled and until specifically opened by the consumer. With the application of the score in this specified manner with respect to the grain direction of the can end, furthermore, a substantially small amount of force is required to sever the score and open the can end by pulling on the tab. Since the can ends are manufactured individually in a machine or press from which they emerge in randomly oriented angular position, it is essential to orient each individual can end prior to applying the score.

Accordingly, it is an object of the present invention to provide a method and arrangement by which an article such as a can end may be oriented at a predetermined angle with respect to its grain direction.

It is also an object of the present invention to provide a method and arrangement for orienting an article under high-speed production conditions.

It is furthermore an object of the present invention to provide a method and arrangement of the preceding character, which may be applied economically and reliably.

It is still another object of the present invention to provide a method and arrangement for orienting an article without affecting the physical characteristics and properties of the article.

SUMMARY OF THE INVENTION

A method and arrangement by which an article such as a can end, for example is oriented to a predetermined angular position. The can end is embossed with elongated bead type of impressions located at a predetermined angle with respect to the grain direction of the metal used to form the can end. A slide mechanism removes the randomly oriented can end from a conveyor and brings it into contact with a continuously turning wheel. While the can end is being rotated by this continuously turning wheel, an embossment sensing device on the slider mechanism contacts the surface of the can end on which the impressions are embossed. When the can end is rotated so that these embossed impressions face the embossment sensing device, the article or can end becomes removed from contact with the turning wheel. The embossment sensor is in the form of a rotatable roller which projects partially into the embossed impression on the can end when the latter is brought to the position of the roller by the turning wheel. After the can end has been oriented, the slide mechanism permits the can end to drop back onto the conveyor so that the can end is removed in oriented condition.

BRIEF DESCRIPTION OF THE DRAWING

FIG. 10 is a sectional elevational view taken along line 10—10 in FIG. 8 prior to orienting the can end;

FIG. 11 is a partial front view of the arrangement of FIG. 10 during the interval when the can end is being oriented;

FIG. 15 is a plan view taken along line 15—15 in FIG. 12;

FIG. 16 is a partial side view of FIG. 15;

FIG. 17a, b and c are partial diagrammatic views showing, respectively, the position of the can end with respect to the orienting mechanism prior to being oriented, during the interval of being oriented, and after having been oriented.

DESCRIPTION OF THE PREFERRED EMBODIMENTS

Figure 1:
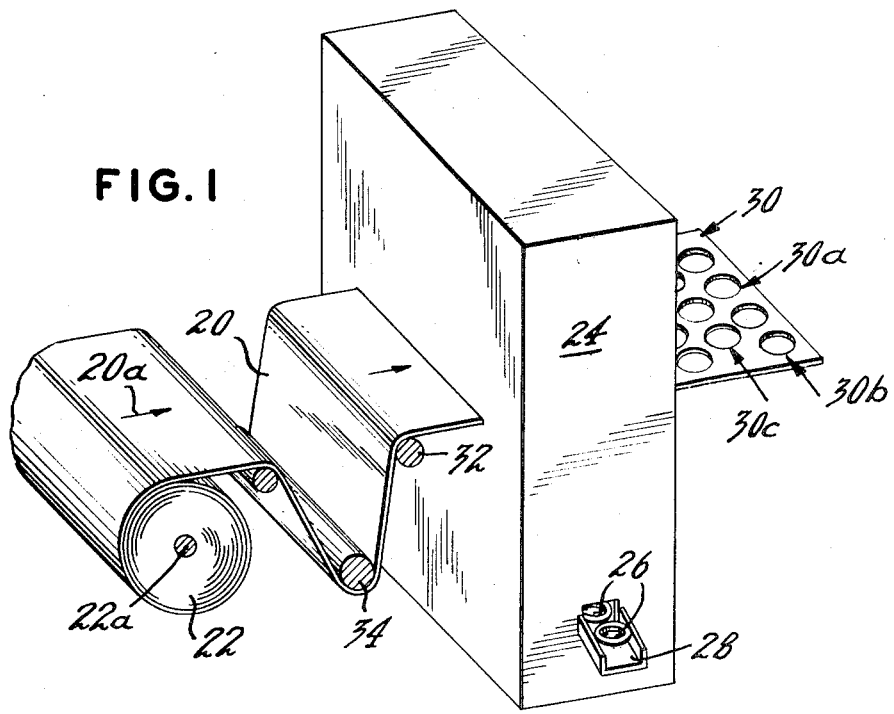
FIG. 1 is an isometric view and shows the arrangement and process for feeding sheet metal into a machine for the fabrication of can ends, in accordance with the present invention.

Referring to the drawing and in particular to FIG. 1, sheet metal 20 is fed from a roll 22 into a gang press 24. Through the processes of stamping and forming, the gang press 24 forms can ends 26 from the sheet metal. The fabricated ends 26 are collected from a trough 28, and the remaining sheet metal 30 containing stamped holes in place of the metal used to fabricate the can ends, emerges from the machine 24 for further processing or gathering for waste material.

The sheet metal 20 being unwound from the roll 22 is all of uniform grain direction, since in manufacturing the sheet metal 20 in a steel mill, for example, it is possible to determine precisely the direction of the grain of the sheet metal, and it is, therefore, readily feasible and possible to wind the sheet metal 20 into the roll 22 so that the grain direction is transverse to the axis 22a of the roll 22. Thus, the grain of the sheet metal 20 is uniformly oriented along the direction of the arrow 20a. The direction of this arrow 20a is also the direction of the movement of the sheet metal 20 in being fed into the machine 24. Looping rollers 32 and 34 assure that the sheet metal is fed into the gang press or fabricating machine 24 under the proper tension and precise feed velocity. The sheet metal 20 may be of the conventional composition used to manufacture the ends for cans or containers well known in the art. Thus, the can ends 26 serve to seal, for example, the ends of a cylindrically shaped can or container. The sheet metal 20 may also be coated or uncoated for this purpose. At the same time, the gang press 24 may stamp out a number of rows of holes 30a simultaneously for a predetermined production capacity. In the embodiment shown in FIG. 1, two rows of holes 30b and 30c are stamped simultaneously by the press 24. The holes 30a are staggered for the purpose of reducing to a minimum the amount of material remaining in the perforated sheet. 30.

Figure 2:
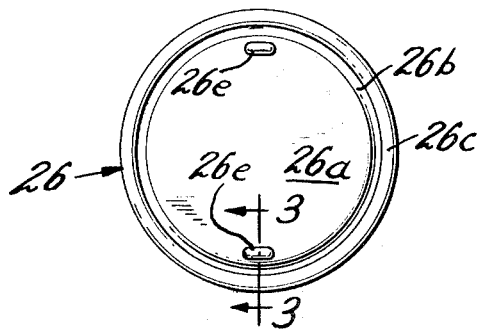
FIG. 2 is a plan view of a can end with embossments applied to identify the grain direction of the metal used to fabricate the can end.
Figure 3:
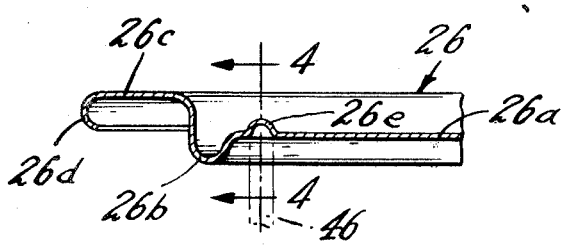
FIG. 3 is a partial sectional view of the can end taken along line 3—3 in FIG. 2.
Figure 4:
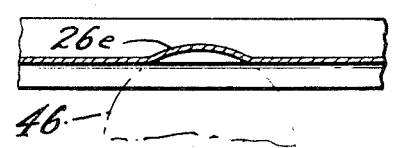
FIG. 4 is a partial sectional view taken along line 4—4 in FIG. 3.

When the can ends 26 are collected from the output trough 28 of the press 24, they have the structure and shape shown in FIGS. 2 to 4. The can end 26 has a panel portion 26a surrounded by a reinforcing groove 26b which, in turn, terminates in a flange 26c having a curled-over portion 26d. The entire can end 26 if fabricated from a single stamped out disc from the sheet metal 20. The end 26, furthermore, has embossments 26e impressed in the panel portion 26a. These embossments 26e are shaped in the form of beads with cross sections shown by FIGS. 3 and 4. The embossed bead 26e has a narrow elongated shape so that the length of the bead exceeds its width. The beads are formed or impressed in the can end 26 during the fabricating process carried out by the gang press 24. When thus impressed or embossed into the end 26, the beads are formed so that their length along their longitudinal axis is always parallel to the grain direction 20a of the sheet metal 20. Accordingly, the direction of the beads is oriented at a predetermined angle with respect to the grain direction of the sheet metal from which the can end 26 is fabricated. It is not essential that the length of the bead 26e be at all times parallel to the direction of the grain in the fabricating metal. It is quite feasible, for example, that the bead 26e be oriented so that its length is made perpendicular to the grain direction. Similarly, the bead 26e may be oriented so that its length is at some predetermined angle between these two extreme limits. The important feature, in accordance with the present invention, is that the orientation between the bead and the grain direction of the base metal be always at some known predetermined angle, so that the grain direction within the can end may be readily predicted by noting the direction of the bead length. Accordingly, the numerical value of the angle of orientation between the bead and the grain direction is not material, provided that the actual angle which prevails is known and remains uniform during the manufacture of an entire selected run of the can ends.

Figure 5:
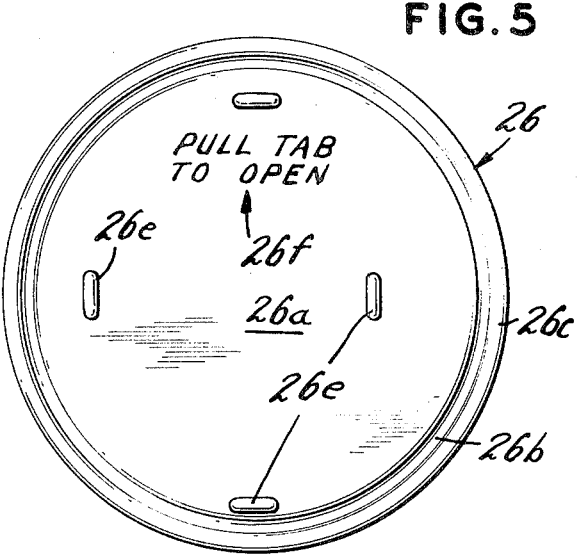
FIG. 5 is a plan view of another embodiment of the embossment arrangement in FIG. 2.

Thus, once the angles between the bead length and the grain direction is known, the can end 26 may then be turned to the proper position so that further processing of the end will be accomplished at the desired angle with respect to the grain direction. When processing or fabricating ends 26 of substantially small diameter, two such embossments 26e may be sufficient for the purpose of orienting the end properly for further processing after emerging from the machine 24. This arrangement is shown in FIG. 2. When, on the other hand, large diameter can ends are used, a bead arrangement as shown in FIG. 5, is of advantage. In this arrangement of FIG. 5, four beads are used and located so that each lies at a different distance from the center of the can end. The four beads 26e in the can end of FIG. 5 serve to provide additional support of the end during the orienting process of the latter for further processing and fabrication and, moreover, the four beads serve to identify a single angular position of the end rather than only its grain direction.

In the arrangement of FIG. 2, for example, the beads 26e will identify the grain direction by identifying any one of two possible angular position of the end, displaced from each other by 180°. Thus, if the can end shown in FIG. 2 were to be rotated by 180°, no observable difference would prevail. This results from the condition that the two beads are symmetrically located on the can end in FIG. 2. Through the asymmetrical arrangement of FIG. 5, it is not possible to rotate the end at any angle, except 360° to obtain a duplicate positioning of the beads. By locating the beads at different distances from the center of the end therefore, the configuration of the four beads as shown in FIG. 5, for example, will correspond to only one single position of the can end. By providing for such unique positioning of the can end, it is not only possible to determine the grain direction of the metal, as described supra, but is is also possible to emboss inscriptions such as opening instructions 26 in such manner that they will be in properly indexed position relative to an opening feature such as a score 26g which is subsequently formed in the end after it has been indexed by virtue of the present invention. If desired, these inscriptions can be preprinted on the strip 20 prior to the time it is fed onto the press 24.

Figure 6:
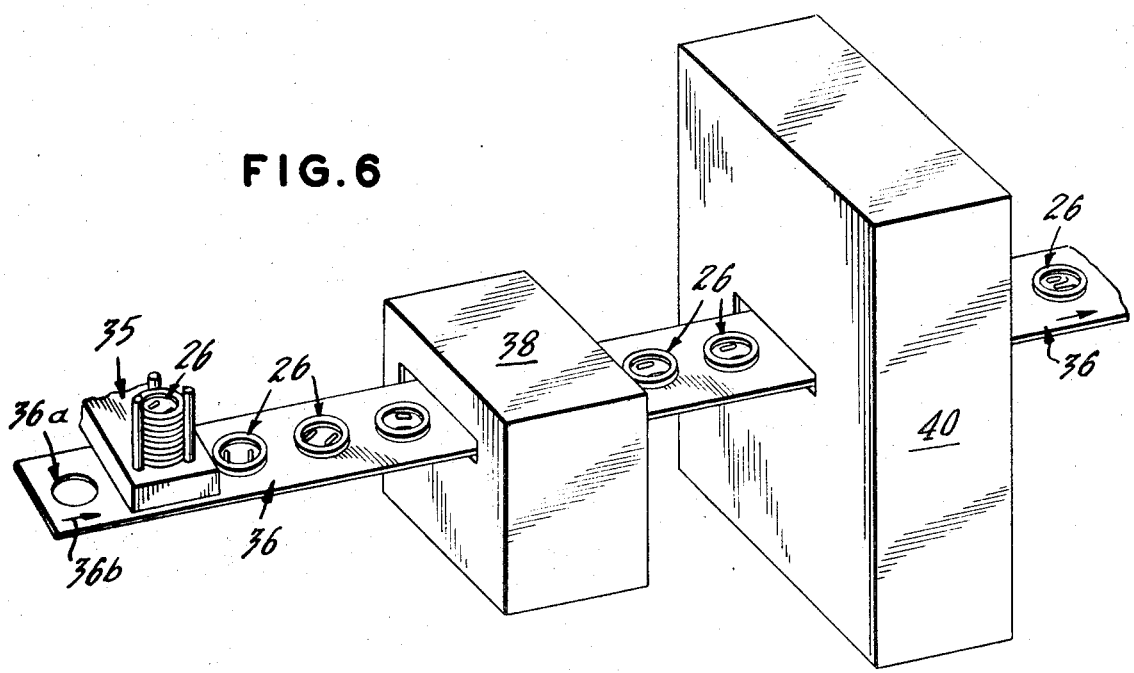
FIG. 6 is an isometric view showing the conveying of manufactured can ends through an orienting device whereby the ends are oriented with respect to their grain direction, in accordance with the present invention.
Figure 7A:
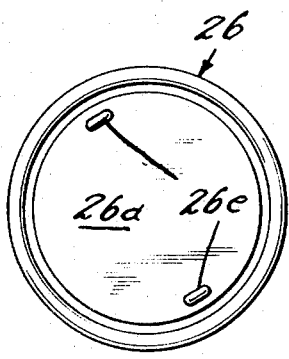
FIG. 7a, b and c are plan views which show, respectively, a randomly oriented can end, a can end oriented at a predetermined angle, and an oriented can end scored after emerging from the orienting device of FIG. 6.
Figure 7B:
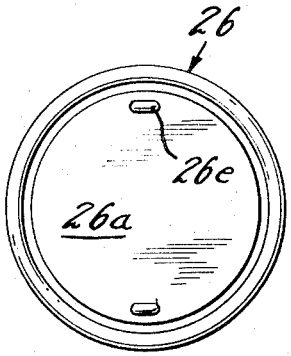
Figure 7C:
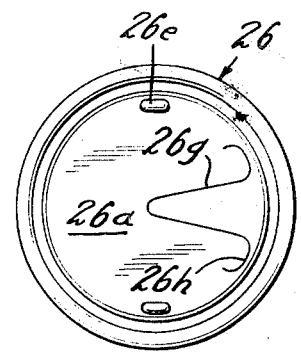
Figure 8:
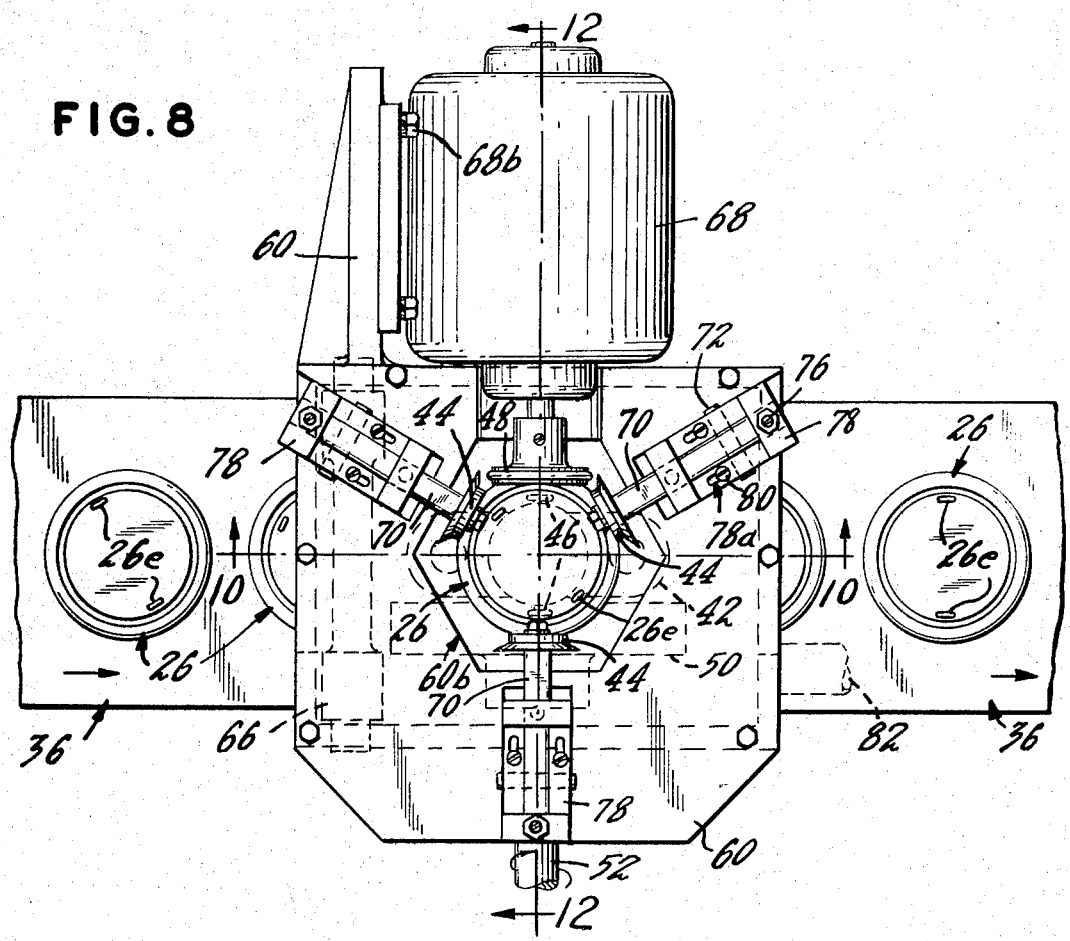
FIG. 8 is a plan view of the orienting device of FIG. 6.
Figure 9:
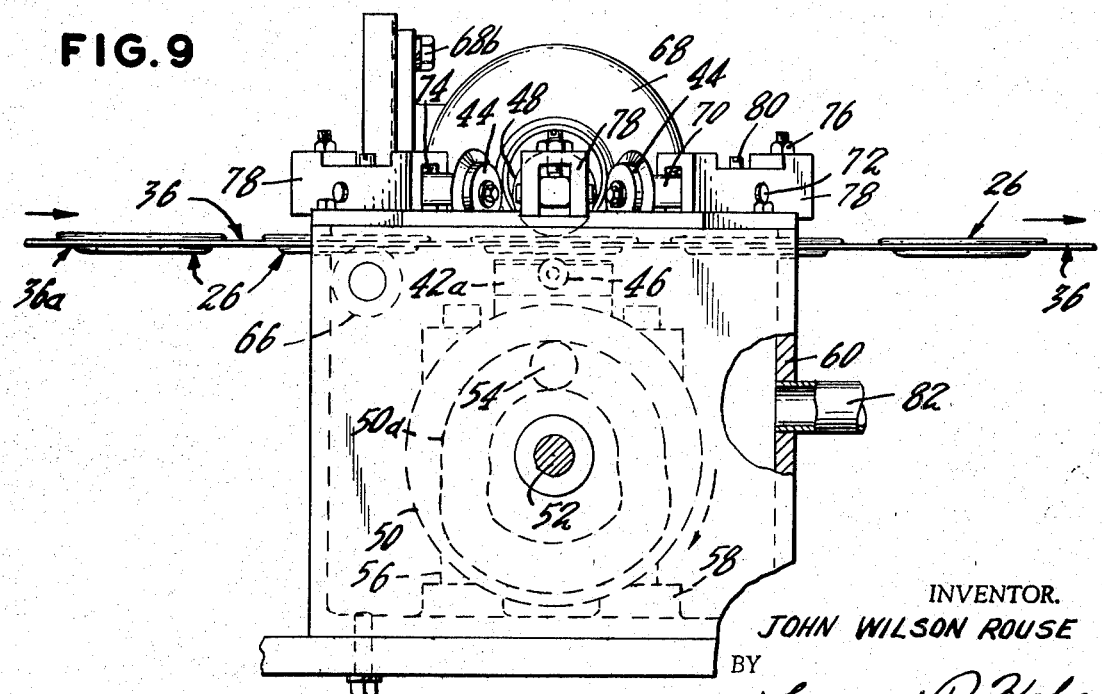
FIG. 9 is a front elevational view of the orienting device of FIG. 8.
Figure 12:
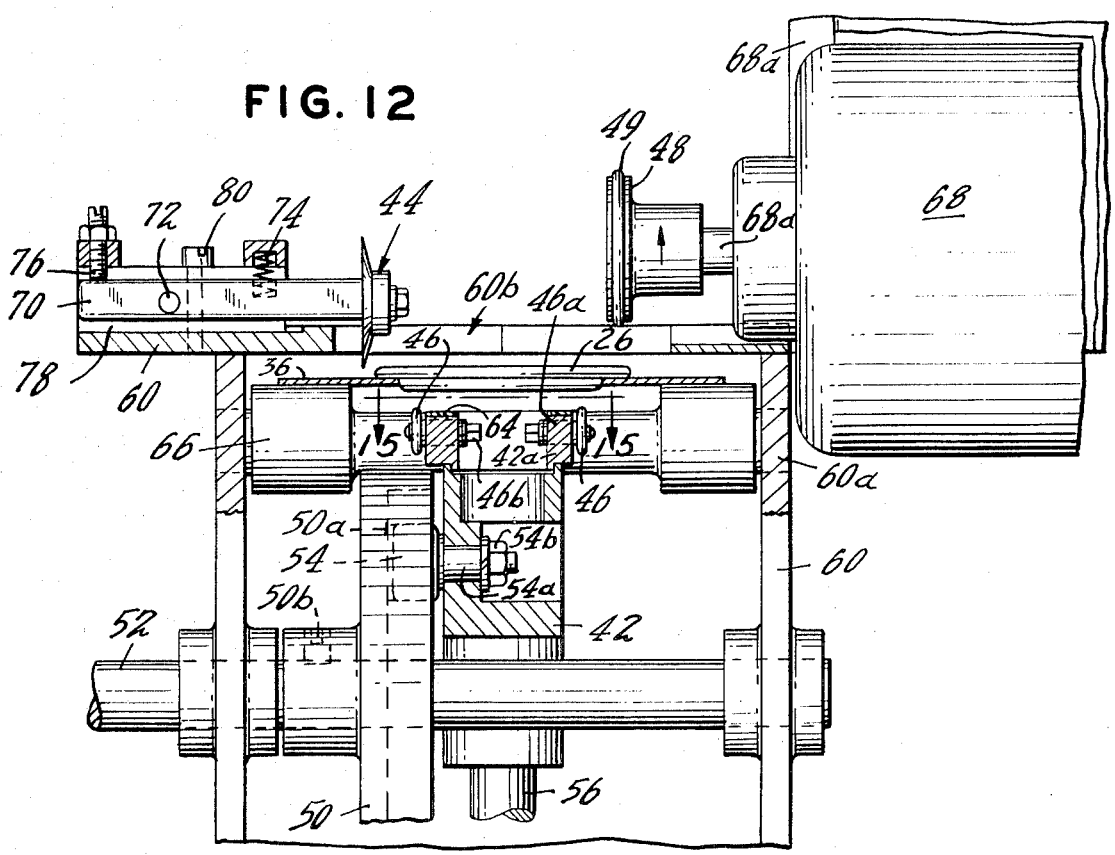
FIG. 12 is a partial sectional view taken along lines 12—12 in FIG. 8 while the can end is on the conveyor prior to being oriented.
Figure 13:
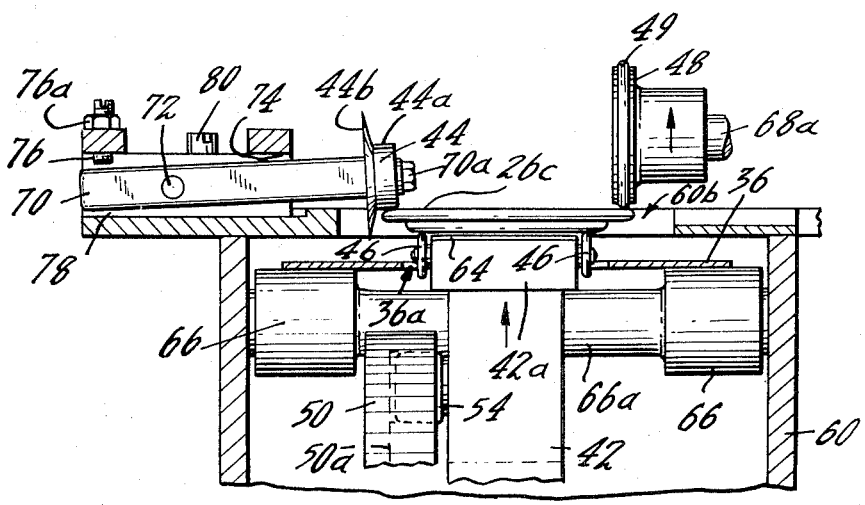
FIG. 13 is a partial sectional view of FIG. 12 with the can end in the position for being oriented.
Figure 14:
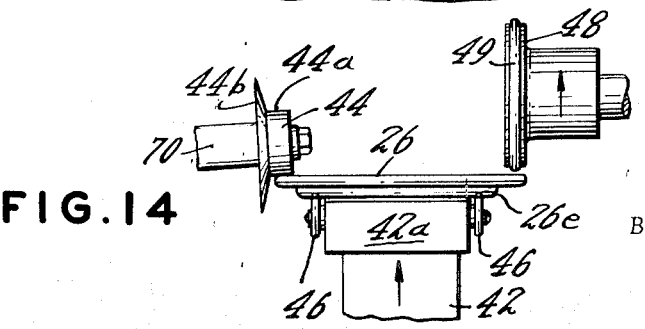
FIG. 14 is a partial view of the arrangement of FIG. 13 and shows in detail the orienting mechanism for the can end.

After the ends 26 are stamped and formed by the gang press 24, and are supplied at the output trough 28, they are stacked in a feed magazine 35. The magazine 35 selects each end 26 individually from the stack and inserts it into a hole 36a of a intermittently driven feed band 36. It is the purpose of the feed band 36 to intermittently feed the ends 26 into an orienting device 38, for orienting each individual end 26, and then into the scoring press 40, shown in FIG. 6, for the purpose of applying a score 26g to the can end, shown in FIG. 7c. When the can end is inserted into the feed band 36 by means of the feed magazine 35, the end is randomly oriented within the hole 36a of the feed band. Since, however, the score 26g is to be applied so that the portion 26h of the score is substantially normal or at a predetermined angle with respect to the grain direction, the orienting device 38 is required to orient each individual end 26 prior to entering the scoring press 40. Thus, after the feed magazine 35 has inserted a can end 26 into an opening 36a of the feed band 36, the length of the beads 26e of the end are randomly oriented as shown in FIG. 7a. After passing through the orienting device 38, however, the length of the beads 26e of the can end emerge oriented at a predetermined angle with respect to tee longitudinal axis of the feed band, as shown in FIG. 7b. The orienting device 38, therefore, serves to feed can ends to the scoring press 40 in a manner whereby the beads 26e, and hence the grain direction of the can end, are at a predetermined angle with respect to the longitudinal axis of the feed band 36. When the score 26g is then applied by the scoring press 40, assurance is had that the resulting score will be at a predetermined orientation with respect to the grain direction of the can end substance.

Thus, while it may be desirable or the portion 26h of the score to be substantially normal to the grain direction and the tapered portion of the score to be oriented at a relatively small angle with respect to the grain direction, this situation may be entirely reversed in another situation. Other circumstances may also deem it desirable for applying the score 26g at some other preselected angle with respect to the grain direction. In accordance with the present invention, the specific angle of orientation with respect to the grain direction is not material. Through the orienting device 38, the present invention orients all can ends so that their grain directions are all uniformly directed to enable the scoring press 40, for example, to apply a score uniformly with respect to the grain direction of all can ends processed. Whereas the can ends are oriented by the device 38 for the purpose of applying a score to them through the press 40, shown in the embodiment of FIG. 6, orienting of the can ends may be carried out for purposes other than scoring, such as inscribing the can ends or applying further forming and embossing processes.

To orient each can end individually, the feed band 36 is moved intermittently through the orienting unit 38. Each time the feed band 36 stops, in its intermittent motion, a can end 26 is positioned above a slide 42 which moves first up and then back down in a cycle of motion during the period of time that the feed band 36 is stationary. At the beginning of this cycle of motion of the slide 42, the can end 26 is positioned over the slide, as sown in FIG. 10. During the upward motion of the slide 42, the can end 26 is lifted by the slide head 42a out of the hole 36a of the feed band 36, and into the position shown in FIG. 11. In this position of the can end, the flange 26c of the end bears against guide wheels 44, as a result of upward pressure exerted on the panel portion 26a of the can ends through the head sensing rollers 46 mounted onto the slide head 42a. At the same time, the flange 26c of the can end also bears against a rotating wheel 48 which rotates in the direction of the arrow 48a. As a result of the rotation of the wheel 48, the can end is also rotated on the rollers 46. When the beads 26e opposite the rollers 46, the can end drops vertically downward so that the beads 26e become seated onto the rollers 46. Once the can end thus drops downward it moves away from the rotating wheel 48, and therefore, no rotational moment is applied any longer to the can end.

The slide 42 remains in the upward position of FIG. 11 for a period of time which is sufficient to assure that the can end has been rotated adequately to allow the beads 26e to drop onto the bead-sensing rollers 46. After this dwell period of the slide 42 in the upward position, the slide is returned downward to its lower position and the can end is permitted to drop back into its seat opening 36a in the conveying band 36. Since the angular position of the can end remains unchanged from the instant that it drops onto the rollers 46 through the beads 26e, the can end, after returning to its seat 36a, is in an oriented position in which the bead lengths are parallel to the cross-sectional planes of the rollers 46. The can end to the right of the slider 42 in FIGS. 10 and 11 therefore, leaves the orienting unit 38 so that the longitudinal axis of the beads 26e are parallel to the longitudinal axis of the feed band 36.

Once the slide 42 has been moved downward sufficiently so that the oriented end 26 is returned into the opening or hole 36a of the band, motion may again be applied to the band to advance it so that another randomly oriented can end is brought above the slide 42. For applying upward and downward directed motion to the slide 42, a cam roller 54 mounted on the slide 42 by an axle 54a engaged a groove 50a of a cam 50 rotated by a shaft 52.

The profile of the cam groove 50a is such that the cam roller 54 is moved vertically between the two extreme positions as shown in FIGS. 10 and 11. The lowest position of the can roller 54, in which the slide 42 and rollers 46 are entirely clear of the can end 26, is shown in FIG. 10. The highest position of cam roll 54, on the other hand, corresponds to the slide position in FIG. 11, in which the rollers 46 force the can end to bear against the rotating wheel 48. The bead sensing rollers 46 are freely rotatably mounted on the slide head 42a.

To guide the slide 42 during its cycle of motion, guide posts 56 extend slidably trough bores within the slide member 42. The guide posts are firmly mounted in vertical position through the flanges 58 secured to the machine frame 60 which, in turn, rests upon the floor or work base 62.

Frictional material 64, such as rubber, is mounted on the top surface of the slide head 42a for the purpose of acting against rotation of the can end 26 when the latter has been oriented so that the rollers 46 lie within the beads 26e and the flange 26c of the can end 26 is separated from the turning wheel 48. The frictional layer 64, therefore, serves to hold the can end in place after it has aligned or oriented over the bead sensing rollers 46. In the absence of the frictional layer 64, it is possible that the can end may overshoot the position in which the beads lie over the rollers 46, as a result of the angular momentum of the rotating can end.

To feed the can end intermittently over the slide member 42, the conveying band 36 passes over conveying shaft 66 having a central necked-down portion 66a to allow the can ends seated in the band to pass freely over the shaft. Thus, the portion of the can end extending beneath the band 36 through the hole 36a, passes freely through the space 66b resulting from the smaller diameter of the central portion 66a of the conveying shaft 66. The shaft 66, therefore, is designed so that the band may carry the can ends freely through the orienting unit 38, with portions of the can end protruding or extending beneath the band 36. With the shaft 66 is mounted within bearings 60a of the machine frame 60.

When the slide 42 is in its upmost position and the can end 26 has not, as yet, been oriented so that the beads 26e lie over the bead sensing rollers 46, the flange 26c of the can end bears against the turning wheel 48 as well as the guide wheels 44. The turning wheel 48 is continuously rotated in the direction 48a, by being mounted upon the shaft 68a of a motor 68. The wheel 48 is rapidly rotated by the motor for the purpose of quickly orienting the can end during the period of time that the slide 42 is held in the upper position through the action of the cam 50.

To aid in the rotation of the cam end 26 by the wheel 48, a rubberized O-ring 49 is secured to the rim surface of the wheel 48. The rubberized ring 49 serves to increase the friction acting on the flange 26c for the purpose of rotating the can end into oriented position. Thus, as a result of the presence of the O-ring 49, slippage between the flange 26c and the rotating wheel 48 is maintained at a minimum.

For the purpose of preventing the can end from tipping when forced against the rim of the wheel 48 by the slide 42, three guide wheels 44 are positioned equiangularly about the flange 26c of the can end. Each guide wheel 44 is shaped with a portion 44a riding on the top surface of the flange 26c, a portion 44b bearing against the curled-over portion 26d of the can end 26. With three of such guide wheels 44 mounted equally spaced from each other about the flange 26c of the can end, the latter is prevented from shifting translationally in position as a result of the rotary motion applied to it by the turning wheel 48. Thus, the three guide wheels 44 assure that the central axis of the can end remains fixed in space, and that the can end 26 can undergo rotary motion. Three guide wheels 44 are used since three points determine a circle. The circular flange-end portion 26d is therefore confined through the position of the three guide 2 wheels 44.

The guide wheels 44 are each freely rotatable abut a shaft 70 pivotable about a pin 72. Acting upon the shaft 70 is spring 74 which tends to maintain pressure between the guide wheel portion 44a and the flange 26c. As a result of the action of this spring 74, the shaft 70 is pivoted so as to maintain pressure between the can end 26 and the bead-sensing rollers 46. When the beads 26e lie opposite the sensing rollers 46 through the turning action of the wheel 48, the guide wheels 44, through the action of spring 74, force the can end downward so that the roller 46 extends directly into the recess of the bead 26e as shown in FIG. 17c.

To conform to the contour of the rim surface of the sensing rollers 46, the beads 26e are curved, along their lengths so as to contact the external diameter 46a of the rollers 46, as shown in FIG. 4. Thus, when the can end has been forced downward by the guide wheels 44 and the rollers 46 project into the recesses of the beads 26e, the interior of the bead recesses are in contact with the circular portion of the rimmed surface of the roller 46. This curvature imparted to the beads 26e along their longitudinal axis, serves to smooth the motion during which the can end moves downward so that the rollers 46 extend partially into the recesses of the beads.

To limit he angle by which the shaft 70 is pivoted by the spring 74 when the slide 42 is moved downward and the can end 26 is moved out of contact with the guide wheels 44, an adjustable limit stop 76 is provided This stop in the form of a set screw held in place by a nut 72a permits adjustment of the pivoting angle of the shaft 70. The guide wheels 44 are mounted onto the shaft 70 through a conventional fastening device 70a.

In addition to adjusting the pivoting angle of the shaft 70, the radial position of the guide wheel 44 with respect to central axis of the can end, may also be adjusted. Such adjustment in the radial position of the guide wheel 44 is accomplished by adjusting the position of the block 78. The guide wheel blocks are held firmly in place on the machine frame 60 through set screws or bolts 80 extending through slots 78a in the blocks. Thus, by loosening the set screws or bolts 80, the blocks may be adjusted in position and the guide wheels 44 may thereby move towards or away from the flange of the can end. After the guide wheels have been properly adjusted in their positions, the setscrews 80 may be retightened and the blocks 78 will then hold the wheels 44 in fixed position with respect to the central axis of the can end.

The bead-sensing rollers 46 are also adjustable in height for the purpose of assuring that the panel 26a of the can end rests firmly against the frictional layer 64 when the roller 46 extends into the recess of the bead 26e. Thus, should the roller 46 be too high, the can end will be prevented from moving sufficiently downward so that it will bear against the frictional surface of the layer 64. If the roller 46 is on the other hand, too low, the rapidly turning can end may not become caught by the rollers and will therefore fail to become oriented. The height adjustment of the bead sensing rollers 46 is accomplished through an eccentric mounting of the shaft 46a as sown in FIGS 15 and 16. Thus, by turning the threaded fastening member 46b, the shaft 46a, eccentrically located with respect to the axis of the device 46b, will raise or lower the roller 46 in accordance with the amount of the rotation of the threaded fastening 46b. After the height position of the roller 46 has been adjusted to the required lever, setscrews 47 may be tightened against the member 46b to maintain it firmly in the adjusted angular position. Screws 65 retain the frictional layers 64 on the top surface of the slide head 42a.

The top plate of the machine frame 60 has a cutout 60b which permits the can end to be moved upward and against the rim of the turning wheel 48 for the purpose of orienting the end. The turning wheel 48 may be adjusted in position through the bolts 68b which hold the motor 68 secured to the machine frame 60. Thus, by loosening the bolt 68b the motor 68 and hence the wheel 48 may be moved with respect to the can end located in place by the guide wheels 44, and after this adjustment has been made, the bolts 68b are retightened to maintain this adjusted position of the turning wheel 48.

The conveying band 36 is intermittently advanced through the distance between central axis of adjacent can ends 26 in alternate sequence with a complete cycle of the cam 50, so that a can end 26 is precisely positioned with respect to the slide 42 when the conveying band 36 is at rest to allow orienting of the can end 26. A vacuum source 82 located at the exit of the orienting unit 38, aids in maintaining the can ends fixed in their oriented position on the bands while being transferred from the orienting units and into the scoring press 40.

What is claimed is:

1. A process for feeding a container component into an operating station with said component being in a single angular position with respect to the direction of feed, comprising the steps of:
    forming at least two irregularities in a surface of said component at predetermined angular locations on said component with each of said locations being a distance from the center of said component which is different from that distance of the other;
    feeding said component to an orienting station with said irregularities formed thereon in randomly oriented angular positions with respect to the direction of feed;
    utilizing said irregularities formed on the surface of said component to orient said component to said single angular position with respect to the direction of feed; and
    feeding said component oriented in its single angular position with respect to the direction of feed into said operating station.

2. A process for orienting a substantially planar article to a predetermined angular position, said article having at least one irregularity formed at a predetermined location on its planar surface, comprising the steps of:
    bringing into contact with said article a sensor mateable with the irregularity on said article;
    bringing said article into contact with a rotating drive means in order to cause rotation of said article with respect to said sensor; and
    moving said article out of contact with said rotating drive means and toward said sensor when said irregularity and sensor are in a mateable position with respect to each other in order to cause the mating of said irregularity and sensor simultaneously with the termination of rotation of said article with respect to said sensor, said article being oriented at said predetermined angular position when said irregularity and sensor are mated.

3. A process for orienting a substantially planar article to a predetermined angular position, comprising the steps of:
    forming an irregularity in the planar surface of said article at a predetermined location on said article, said irregularity being in the form of a concave recess;
    bringing into contact with said article a sensor having an exterior surface in a form mateable with the irregularity on said article;
    bringing said article into contact with a rotating drive means in order to cause rotation of said article with respect to said sensor; and
    moving said article out of contact with said rotating drive means and toward said sensor when said irregularity and sensor are in a mateable position with respect to each other in order to cause the mating of said irregularity and sensor simultaneously with the termination of rotation of said article with respect to said sensor, said article being oriented at said predetermined angular position when said irregularity and sensor are mated.

4. A process for orienting a substantially planar article to a predetermined angular position, said article having at least one irregularity formed at a predetermined location on its planar surface, comprising the steps of:
    bringing into contact with said article a sensor mateable with the irregularity on said article;
    bringing said article into contact with a rotating drive means in order to cause rotation of said article with respect to said sensor; and
    moving said article out of contact with said rotating drive means and toward said sensor when said irregularity and sensor are in a mateable position with respect to each other by forcing said article to drop through a predetermined distance with respect to said sensor and said rotating drive means in order to cause the mating of said irregularity and sensor simultaneously with the termination of rotation of said article with respect to said sensor, said dropping of said article being used to initiate the termination of rotation of said article, and said article being oriented at said predetermined angular position when said irregularity and sensor are mated.

5. A process for orienting a substantially planar article to a predetermined angular position, comprising the steps of:
    forming an irregularity in the planar surface of said article at a predetermined location on said article;
    bringing into contact with said article a sensor mateable with the irregularity on said article;
    bringing said article into contact with a rotating drive means in order to cause rotation of said article with respect to said sensor; and
    moving said article out of contact with said rotating drive means and toward said sensor when said irregularity and sensor are in a mateable position with respect to each other by forcing said article to drop through a predetermined distance with respect to said sensor and said rotating drive means in order to cause the mating of said irregularity and sensor simultaneously with the termination of rotation of said article with respect to said sensor, said dropping of said article being used to initiate the termination of rotation of said article, and said article being oriented at said predetermined angular position when said irregularity and sensor are mated.

6. A process for orienting a substantially planar article to a predetermined angular position, said article having at lest one irregularity formed at a predetermined location on its planar surface, comprising the steps of:
    bringing into contact with said article a sensor mateable with the irregularity on said article;
    bringing said article into contact with a rotating drive means in order to cause rotation of said article with respect to said sensor; and
    maintaining guiding pressure against said rotating article equiangularly about the periphery of said article in order to prevent translational shifting of said article during its rotation and to move said article out of contact with said rotating drive means and toward said sensor when said irregularity and sensor are in a mateable position with respect to each other so that the mating of said irregularity and sensor occurs simultaneously with the termination of rotation of said article with respect to said sensor, said article being oriented at said predetermined angular position when said irregularity and sensor are mated.

7. The process for orienting an article as defined in claim 6 wherein said step of maintaining guiding pressure against said rotating article also brakes said article against a frictional means to insure the termination of rotation of said article and mating of said irregularity and sensor after moving said article out of contact with said rotating drive means and toward said sensor.

8. A process for orienting a substantially planar article to a predetermined angular position, comprising the steps of:
forming an irregularity in the planar surface of said article at a predetermined location on said article;
bringing into contact with said article a sensor mateable with the irregularity on said article;
bringing said article into contact with a rotating drive means in order to cause rotation of said article with respect to said sensor; and
maintaining guiding pressure against said rotating article equiangularly about the periphery of said article in order to prevent translational shifting of said article during its rotation and to move said article out of contact with said rotating drive means and toward said sensor when said irregularity and sensor are in a mateable position with respect to each other so that the mating of said irregularity and sensor occurs simultaneously with the termination of rotation of said article with respect to said sensor, said article being oriented at said predetermined angular position when said irregularity and sensor are mated.

9. A process for orienting a substantially planar article to a predetermined angular position, said article having at least one irregularity formed at a predetermined location on its planar surface, comprising the steps of:
bringing into contact with said article a sensor mateable with the irregularity on said article;
bringing said article into contact with a rotating drive means in order to cause rotation of said article with respect to said sensor;
moving said article out of contact with said rotating drive means and toward said sensor when said irregularity and sensor are in a mateable position with respect to each other; and
braking said article against a frictional means to insure the termination of rotation of said article with respect to said sensor simultaneously with the mating of said irregularity and sensor, said article being oriented at said predetermined angular position when said irregularity and sensor are mated.

10. A process for orienting a substantially planar article to a predetermined single angular position with respect to the grain direction of the material of said article, comprising the steps of:
forming at least two irregularities in the planar surface of said article at predetermined angular locations on said article with each of said locations being a distance from the center of said article which is different from that distance of the other;
bringing into contact with said article, sensors mateable with the irregularities on said article;
bringing said article into contact with rotating drive means in order to cause rotation of said article with respect to said sensors; and
moving said article out of contact with said rotating drive means and toward said sensors when said irregularities and respective sensors are in mateable positions with respect to each other in order to cause the respective matings of said irregularities and sensors simultaneously with the termination of rotation of said article with respect to said sensors, said article being oriented at said predetermined single angular position with respect to the grain direction of the material of said article when said irregularities and sensors are respectively mated.

11. A process for orienting a substantially planar article to a predetermined angular position with respect to the grain direction of the material of said article, comprising the steps of:
forming at least one pair of irregularities in the planar surface of said article at predetermined angular locations on said article with said locations being at substantially equal distances from the center of said article and substantially 180° from each other;
bringing into contact with said article, sensors mateable with the irregularities on said article;
bringing said article into contact with a rotating drive means in order to cause rotation of said article with respect to said sensors; and
moving said article out of contact with said rotating drive means and toward said sensors when said pair of irregularities and respective sensors are in mateable positions with respect to each other in order to cause the respective matings of said irregularities and sensors simultaneously with the termination of rotation of said article with respect to said sensors, said article being oriented at said predetermined angular position with respect to the grain direction of the material of said article when said pair of irregularities and respective sensors are mated.

12. In a mechanism for orienting a substantially planar article to a predetermined angular position, said article having at least one irregularity formed at a predetermined location on its planar surface, the combination comprising:
a sensor mateable with the irregularity formed on said article;
a rotating drive means;
means for bringing said sensor into contact with said article, and, thereafter, for bringing said article into contact with said rotating drive means in order to cause rotation of said article with respect to said sensor; and
means for moving said article out of contact with said rotating drive means and toward said sensors when said irregularity and sensor are in a mateable position with respect to each other in order to cause the mating of said irregularity and sensor simultaneously with the termination of rotation of said article with respect to said sensor, said article being oriented at said predetermined angular position when said irregularity and sensor are mated.

13. In a mechanism for orienting an article as defined in claim 12 wherein said irregularity is in the form of a concave recess and said sensor comprises a rotatable member having an exterior surface in a form mateable with said irregularity.

14. In a mechanism for orienting a substantially planar article to a predetermined angular position, said article having at least one irregularity formed at a predetermined location on its planar surface, the combination comprising:
a sensor mateable with the irregularity formed on said article;
a rotating drive means;
means for bringing said sensor into contact with said article, and, thereafter, for bringing said article into contact with translational rotating drive means in order to cause rotation of said article with respect to said sensor; and
means for moving said article out of contact with said rotating drive means and toward said sensor when said irregularity and sensor are in a mateable position with respect to each other by forcing said article to drop through a predetermined distance with respect to said sensor and said rotating drive means in order to cause the mating of said irregularity and sensor simultaneously with the termination of rotation of said article with respect to said sensor, said dropping of said article being used to initiate the termination of rotation of said article, and said article being oriented at said predetermined angular position when said irregularity and sensor are mated.

15. In a mechanism for orienting a substantially planar article to a predetermined angular position, said article having at least one irregularity formed at a predetermined location on its planar surface, the combination comprising;

a sensor mateable with the irregularity formed on said article;

a rotating drive means;

means for bringing said sensor into contact with said article, and, thereafter, for bringing said article into contact with said rotating drive means in order to cause rotation of said article with respect to said sensor; and means for maintaining guiding pressure against said rotating article equiangularly about the periphery of said article in order to prevent translational shifting of said article during its rotation and to move said article out of contact with said rotating drive means and toward said sensor when said irregularity and sensor are in a mateable position with respect to each other so that the mating of said irregularity and sensor occurs simultaneously with the termination of rotation of said article with respect to said sensor, said article being oriented at said predetermined angular position when said irregularity and sensor are mated.

16. In a mechanism for orienting a substantially planar article to a predetermined annular position, said article having at least one irregularity formed at a predetermined location on its planar surface, the combination comprising:

a sensor mateable with the irregularity formed on said article;

a rotating drive means;

means for bringing said sensor into contact with said article, and, thereafter, for bringing said article into contact with said rotating drive means in order to cause rotation of said article with respect to said sensor;

a frictional means; and means for maintaining guiding pressure against said rotating article equiangularly about the periphery of said article in order to prevent translational shifting of said article during its rotating and to move said article out of contact with said rotating drive means, toward said sensor when said irregularity and sensor are in a mateable position with respect to each other, and against said frictional means to insure the termination of rotation of said article with respect to said sensor simultaneously with the mating of said irregularity and sensor, said article being oriented at said predetermined angular position when said irregularity and sensor are mated.

17. In a mechanism for orienting a substantially planar article to a predetermined signal angular position with respect to the grain direction of the material of said article, said article having at lest two irregularities formed at predetermined angular locations on said article with each of said locations being a distance from the center of said article which is different from the distance of the other the combination comprising:

sensors which are simultaneously mateable with the irregularities formed on said article:

a rotating drive means;

means for bringing said sensors into contact with said article, and, thereafter, for bringing said article into contact with said rotating drive means in order to cause rotation of said article with respect to said sensors; and means for moving said article out of contact with said rotating drive means and toward said sensors when said irregularities and respective sensors are in mateable positions with respect to each other in order to cause the respective matings of said irregularities and respective sensors simultaneously with the termination of rotation of said article with respect to said sensors, said article being oriented at said predetermined single angular position with respect to the grain direction of the material of said article when said irregularities and respective sensors are mated.

18. In a mechanism for orienting a substantially planar article to a predetermined angular position with respect to the grain direction of the material of said article, said article having at lest one pair of irregularities formed at predetermined angular locations on said article with said locations being at substantially equal distances from the center of said article and substantially 180° from each other, the combination comprising:

sensors which are displaced substantially 180° from each other and simultaneously mateable with said pair of irregularities formed on said article;

a rotating drive means;

means for bringing said sensors into contact with said article, and, thereafter, for bringing said article into contact with said rotating drive means in order to cause rotation of said article with respect to said sensors; and means for moving said article out of contact with said rotating drive means and toward said sensors when said pair of irregularities and respective sensors are in mateable positions with respect to each other in order to cause the respective matings of said irregularities and sensors simultaneously with the termination of rotation of said article with respect to said sensors, said article being oriented at said predetermined angular position with respect to the grain direction of the material of said article when said pair of irregularities and respective sensors are mated.

* * * * *